(12) United States Patent
Tyler

(10) Patent No.: X109
(45) Date of Patent: Apr. 15, 1796

(54) WINNOWING WHEAT/CLEANER

(76) Inventor: Benjamin Tyler

THE UNITED STATES OF AMERICA.

*To all to whom theſe Letters Patent ſhall come:*

WHEREAS, BENJAMIN TYLER, a citizen of New-Hampſhire, in the United States, hath alledged, that he has invented a new and uſeful improvement, in the mode of cleaning Wheat, Rye, Buck-Wheat, and all other kinds of grain; which improvement has not been known, or uſed, before his application; has made oath, that he does verily believe, that he is the true inventer, or diſcoverer of the ſaid improvement; has paid into the Treaſury of the United States, the ſum of thirty dollars, delivered a receipt for the ſame, and preſented a petition to the Secretary of State, ſignifying a deſire of obtaining an excluſive propriety in the ſaid improvement, and praying, that a patent may be granted, for that purpoſe: THESE ARE, THEREFORE, to grant, according to law, to the ſaid Benjamin Tyler, his heirs, adminiſtrators, or aſſigns, for the term of fourteen years, commencing from the fourteenth day of the month of April, in this year, the full and excluſive right and liberty of making, conſtructing, uſing, and vending, to others, to be uſed, the ſaid improvement; a deſcription whereof is given in the words of the ſaid Benjamin Tyler, himſelf, in the ſchedule hereunto annexed, and is made a part of theſe preſents.

IN TESTIMONY WHEREOF, *I have cauſed theſe Letters to be made Patent, and the Seal of the United States to be hereunto affixed.*

*(L. S.)* GIVEN *under my hand, at the City of Philadelphia, this fifteenth day of April, in the year of our Lord, one thouſand ſeven hundred and ninety ſix, and of the independence of the United States of America, the Twentieth.*

C. WASHINGTON.

*By the Preſident,*

TIMOTHY PICKERING, *Secretary of State.*

*City of Philadelphia,* TO WIT:

I DO HEREBY CERTIFY, that the foregoing Letters Patent, were delivered to me, on the fifteenth day of April, in the year of our Lord one thouſand ſeven hundred and ninety-ſix, to be examined; and I have examined the ſame, and find them conformable to law. And I do hereby return the ſame, to the Secretary of State, within fifteen days from the date aforeſaid, to wit: On this fifteenth day of April, in the year aforeſaid.

CHARLES LEE, *Attorney General of the United States.*

---

*The Schedule referred to in theſe Letters Patent, and making part of the ſame, containing a deſcription, in the words of the ſaid* Benjamin Tyler, *himſelf, of an improvement in the mode of clearing Wheat, Rye, Buck-Wheat, and all other kinds of grain, a deſcription of the machine invented by* Benjamin Tyler, *for cleaning wheat and all other kinds of grain, and ſeparating from it ſmut, dirt, and all impurities, and mixtures of other ſeeds, and for rendering ſweet and pure, Grain, that has grown, or which is ſour or muſty.*

THE operation of cleaning is performed, by firſt letting the grain into a cylinder; Fig. 1. through which it drops down into ſtones, which are hung, like mill-ſtones; the eye or hole, through the top ſtone, is filled up by a piece of plank, or thick board, which is fixed into the eye; and a hole is bored through that plank, or thick board, of an inch and an half diameter, into which a tap or plug is put, and may be taken out occaſionally, when more air is wanted between the ſtones; the lower ſtone is ſix inches in diameter larger than the upper ſtone; and a round iron grater, Fig. 2. ſixteen inches in width, and as large in circumference, as the lower ſtone, is put round the upper edge of that ſtone, like a hoop, and is preſt down as much as an inch from the top of the ſtone. The grater is made of ſheet iron, and has holes punched through it; the top of the grater is cloſely covered with boards, except a place in the middle, about two feet in diameter, on which is fixed a wooden cylinder, three feet and an half in height, into which the grain is firſt put, as abovementioned, and through which the ſteam ariſes, when the machine is at work; the ſtones are placed at the diſtance of an inch, or an inch and an half, from each other; generally, a buſhel of grain is put in at once: the motion of the ſtone, and the rubbing the grain thereby, occaſions a very conſiderable degree of heat, and in ſix, eight, or ten minutes the grain is dry; the moiſture, together with the ſour and offenſive perticles, having gone off in ſteam, through the cylinder, and the ſmut and grown parts are ſeparated from the kernel; when it is ſufficiently worked, the grain is let down, through a ſpout, into the blowing mill, which ſpout is, at other times, covered by a piece of iron, ſlipped in at the top of it. A double crank goes through the ſhaft of the wheel, of the blowing mill, and the wheel of the blowing mill is turned by a band, which goes round the ſpindle, upon which the ſtone turns. The grain will acquire ſuch a degree of heat, that it will not be fit to grind, immediately.

BENJAMIN TYLER.

VESTER EVANS,
DANIEL BUTLER.

NOTE. The above figures, 1 and 2, refer to the drawing in the office of the Department of State.

NOW KNOW YE, that we ROSWELL and MILLS OLCOTT of Norwich, in the county of Windſor, and State of Vermont, are the lawful proprietors of the above excluſive right, ſecured by patent, as aforeſaid, by virtue of a transfer of the ſame, from the ſaid BENJAMIN TYLER to us, and we hereby for the conſideration of dollars received to our full ſatisfaction of do hereby ſell, and transfer to the ſaid and to give and grant liberty to conſtruct, uſe, and practice, the ſaid improvement, of cleaning wheat, rye, and all kinds of grain, in the manner as ſecured by Patent, within the diſtrict hereafter deſcribed to wit.

In witneſs whereof, we have hereunto ſet our hands and ſeals this day of A. D.

Executed by
Frederick Chase

Roswell Olcott

DRAFTSMAN'S DIVISION.

*All communications should be addressed to "The Commissioner of Patents, Washington, D. C."*

2—328 *a.*

*DEPARTMENT OF THE INTERIOR,*

United States Patent Office,

*Washington, D. C.,* ..........., 189...

*SIR:*

*The printed* copies *of Patent No.* Benj Tyler Apr 15 1796 are *exhausted.*

*As soon as printed a copy will be mailed you to complete your order.*

*By direction of the Commissioner:*

*Very respectfully,*

*Chief Clerk.*

3143b6-97-5m